United States Patent
Bromberg et al.

(10) Patent No.: US 10,387,322 B2
(45) Date of Patent: Aug. 20, 2019

(54) MULTIPLE READ AND WRITE PORT MEMORY

(71) Applicant: Marvell Israel (M.I.S.L) Ltd., Yokneam (IL)

(72) Inventors: Dror Bromberg, Michmoret (IL); Roi Sherman, Yokneam (IL); Rami Zemach, Givat Shapira (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 0 days.

(21) Appl. No.: 15/143,200

(22) Filed: Apr. 29, 2016

(65) Prior Publication Data
US 2016/0321184 A1  Nov. 3, 2016

Related U.S. Application Data

(60) Provisional application No. 62/159,482, filed on May 11, 2015, provisional application No. 62/158,703, (Continued)

(51) Int. Cl.
*G06F 12/08* (2016.01)
*G06F 12/0871* (2016.01)
(Continued)

(52) U.S. Cl.
CPC ...... *G06F 12/0871* (2013.01); *G06F 11/1076* (2013.01); *G06F 12/0811* (2013.01);
(Continued)

(58) Field of Classification Search
CPC ............ G06F 12/0871; G06F 12/0811; G06F 13/4022; G06F 12/0875; G06F 11/1076;
(Continued)

(56) References Cited

U.S. PATENT DOCUMENTS 4,870,643 A  9/1989  Bultman et al.
5,414,455 A  5/1995  Hooper et al.
(Continued)

FOREIGN PATENT DOCUMENTS

WO  WO-02/071230 A1  9/2002
WO  WO-2008/121306 A2  10/2008
WO  WO-2010071655 A1  6/2010

OTHER PUBLICATIONS

International Search Report and Written Opinion in International Application No. PCT/IB2016/00673, dated Oct. 5, 2016 (11 pages).
(Continued)

*Primary Examiner* — David Yi
*Assistant Examiner* — Zubair Ahmed

(57) ABSTRACT

A memory supports a write or multiple read operations in any given clock cycle. In a first clock cycle, new content data is written to a particular content memory bank among a set of content memory banks. Also in the first clock cycle, current content data is read from corresponding locations in one or more other content memory banks among the set of content memory banks. New parity data is generated based on the new content data written to the particular content memory bank and the current content data read from the one or more other content memory banks. The new parity data is written to a cache memory associated with the one or more parity banks. In a second clock cycle subsequent to the first clock cycle, the new parity data is transferred from the cache memory to one of the one or more parity memory banks.

22 Claims, 6 Drawing Sheets

Related U.S. Application Data filed on May 8, 2015, provisional application No. 62/158,708, filed on May 8, 2015, provisional application No. 62/157,707, filed on May 6, 2015, provisional application No. 62/157,716, filed on May 6, 2015, provisional application No. 62/156,693, filed on May 4, 2015, provisional application No. 62/155,683, filed on May 1, 2015, provisional application No. 62/154,793, filed on Apr. 30, 2015, provisional application No. 62/154,797, filed on Apr. 30, 2015.

(51) Int. Cl.
*G06F 12/0811* (2016.01)
*G06F 13/40* (2006.01)
*G06F 12/0875* (2016.01)
*G06F 11/10* (2006.01)

(52) U.S. Cl.
CPC ...... *G06F 12/0875* (2013.01); *G06F 13/4022* (2013.01); *G06F 2212/283* (2013.01); *G06F 2212/452* (2013.01); *G06F 2212/604* (2013.01)

(58) Field of Classification Search
CPC ......... G06F 2212/283; G06F 2212/452; G06F 2212/604; G06F 11/1044; G06F 11/1064
USPC ....................................................... 711/123
See application file for complete search history.

(56) References Cited

U.S. PATENT DOCUMENTS

| | | | |
|---|---|---|---|
| 5,508,732 A | 4/1996 | Bottomley et al. | |
| 5,581,479 A | 12/1996 | McLaughlin et al. | |
| 5,621,882 A | 4/1997 | Kakuta | |
| 5,636,139 A | 6/1997 | McLaughlin et al. | |
| 5,893,919 A * | 4/1999 | Sarkozy | G06F 11/1008 711/114 |
| 6,397,324 B1 | 5/2002 | Barry et al. | |
| 7,437,472 B2 | 10/2008 | Rose | |
| 7,451,467 B2 | 11/2008 | Carver et al. | |
| 7,934,120 B2 * | 4/2011 | Zohar | G06F 11/1076 711/114 |
| 8,358,651 B1 | 1/2013 | Kadosh et al. | |
| 8,402,217 B2 * | 3/2013 | Burd | G06F 11/1028 365/185.33 |
| 8,514,651 B2 * | 8/2013 | Levy | G06F 13/16 365/185.09 |
| 8,724,423 B1 | 5/2014 | Zhou et al. | |
| 9,053,009 B2 * | 6/2015 | Ho | G06F 11/1044 |
| 9,766,978 B2 | 9/2017 | Kittner | |
| 2003/0046477 A1 | 3/2003 | Jeddeloh | |
| 2003/0120861 A1 | 6/2003 | Calle et al. | |
| 2003/0182491 A1 | 9/2003 | Chudnovsky et al. | |
| 2004/0090840 A1 | 5/2004 | Lee et al. | |
| 2004/0107308 A1 | 6/2004 | Andreev et al. | |
| 2006/0282588 A1 | 12/2006 | Proujansky-Bell | |
| 2011/0047439 A1 | 2/2011 | Jorda et al. | |
| 2011/0258362 A1 | 10/2011 | McLaren et al. | |
| 2012/0127818 A1 | 5/2012 | Levy et al. | |
| 2013/0024613 A1 | 1/2013 | Benhase et al. | |
| 2013/0205183 A1 | 8/2013 | Fillingim et al. | |
| 2016/0162359 A1 | 6/2016 | Kittner | |

OTHER PUBLICATIONS

U.S. Appl. No. 15/092,634, filed Apr. 7, 2016.
U.S. Appl. No. 15/130,980, filed Apr. 17, 2016.
U.S. Appl. No. 15/693,221, Sherman et al. "Multiple Read and Write Port Memory," filed Aug. 31, 2017.
Office Action in U.S. Appl. No. 15/693,221, dated Jan. 11, 2019 (29 pages).
Office Action in U.S. Appl. No. 15/693,221, dated May 30, 2019 (26 pages).

\* cited by examiner

MULTIPLE READ AND WRITE PORT MEMORY

CROSS-REFERENCES TO RELATED APPLICATIONS

The present application claims the benefit of the following U.S. Provisional patent applications:

U.S. Provisional Patent Application No. 62/154,793, entitled "Multi-Bank Access for Two Read Ports or One Write Port Memory," filed on Apr. 30, 2015;

U.S. Provisional Patent Application No. 62/154,797, entitled "Multi-Bank Access for Two Read Ports or One Read Port and One Write Port Memory," filed on Apr. 30, 2015;

U.S. Provisional Patent Application No. 62/155,683, entitled "Multi-Bank Access for Two Read Ports and Two Write Ports Dynamic Memory," filed on May 1, 2015;

U.S. Provisional Patent Application No. 62/156,693, entitled "Bank Multi Access for Four Read Ports or Four Write Ports Memory," filed on May 4, 2015;

U.S. Provisional Patent Application No. 62/157,707, entitled "Bank Multi Access for 4 Read Ports or Four Write Ports Dynamic Memory," filed on May 6, 2015;

U.S. Provisional Patent Application No. 62/157,716, entitled "Bank Multi Access for Four Read Ports or Four Read and One Write Ports Memory," filed on May 6, 2015;

U.S. Provisional Patent Application No. 62/158,703, entitled "Bank Multi Access for Four Read Ports And Four Write Ports Dynamic Memory," filed on May 8, 2015;

U.S. Provisional Patent Application No. 62/158,708, entitled "Bank Multi Access for Multiple Read Ports and Multiple Write Ports," filed on May 8, 2015; and U.S. Provisional Patent Application No. 62/159,482, entitled "Bank Multi Access for Four Read or One Write Memory," filed on May 11, 2015;

The disclosures of all of the above-referenced patent applications are hereby incorporated by reference herein in their entireties.

FIELD OF THE DISCLOSURE

The present disclosure relates generally to computer memories, and more particularly, to memory devices having multiple memory banks and storing parity information to support multiple simultaneous memory accesses.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional memory single port devices typically are configured so that during any given clock cycle only a single memory operation, such as a read operation or a write operation, can be performed at a particular block of memory. Moreover, because write operations may require several clock cycles to complete, performance of various read operations may also be delayed for several clock cycles in conventional memories. In the context of some networking or switching applications, various data that is used for packet processing, for example control tables, forwarding tables and the like, are shared among various switching devices or switching cores of a single device. At times, these multiple devices and cores need to perform read and write operations in a particular memory block during the same clock cycle.

In some systems, various devices are provided with their own respective memories, however such a solution is expensive both in terms of the direct cost of additional memory as well as in terms of resources required to keep the different memories synchronized.

U.S. Pat. No. 8,514,651, entitled "Sharing Access to a Memory Among Clients", and which is assigned to the present assignee and incorporated by reference herein in its entirety, describes a system and method in which two or more read requests to read data from a target memory bank shared by two or more clients are serviced during a single clock cycle. A first one of the read requests is serviced by permitting direct accesses to the target memory bank during a clock cycle. The additional read requests are also serviced in the clock cycle by using redundancy data to reconstruct data in the target memory bank without directly accessing the target memory bank.

SUMMARY

In an embodiment, a memory for use in a network device comprises a set of content memory banks configured to store content data associated with processing network packets. The memory also comprises one or more parity memory banks corresponding to the set of content memory banks configured to store parity data, and a cache memory corresponding to the one or more parity memory banks. The memory additionally comprises a memory controller device configured to, in a first clock cycle, in response to receiving a write request to write new content data to a location in a particular content memory bank among the set of content memory banks, (a) write the new content data to the location in the particular content memory bank, and (b) read current data from corresponding locations in one or more other content memory banks among the set of memory banks. The memory controller device is further configured to generate new parity data based on (i) the new content data written to the location in the particular content memory bank and (ii) the current content data read from the corresponding locations in the one or more other content memory banks. The memory controller device is further still configured to write the new parity data to the cache memory. The memory controller device is additionally configured to, in a second clock cycle subsequent to the first clock cycle, transfer the new parity data from the cache memory to the one or more parity memory banks.

In another embodiment, a method of writing new data to a memory device having a set of content memory banks and one or more parity memory banks includes writing, with a memory controller device in a first clock cycle, new content data to a location in a particular content memory bank among the set of content memory banks. The method also includes reading, with the memory controller device in the first clock cycle, current content data from corresponding locations in one or more other content memory banks among the set of content memory banks. The method additionally includes generating, with the memory controller device, new parity data based on (i) the new content data written to the location in the particular content memory bank and (ii) the current content data read from the corresponding locations in the one or more other content memory banks. The method also includes writing, with the memory controller device, the new parity data to a cache memory. The method further still includes transferring, with the memory controller device in a second clock cycle subsequent to the first clock cycle, the new parity data from the cache memory to the one or more parity memory banks.

DETAILED DESCRIPTION

Various embodiments of memory devices are described below. In some embodiments, the memory devices described herein utilize techniques described in U.S. Pat. No. 8,514,651, entitled "Sharing Access to a Memory Among Clients," which is hereby incorporated by reference herein in its entirety. In some embodiments, the memory devices described herein utilize techniques described in U.S. patent application Ser. No. 14/964,219, entitled "System and Method for Performing Simultaneous Read and Write Operations in a Memory," which is hereby incorporated by reference herein in its entirety.

Figure 1:
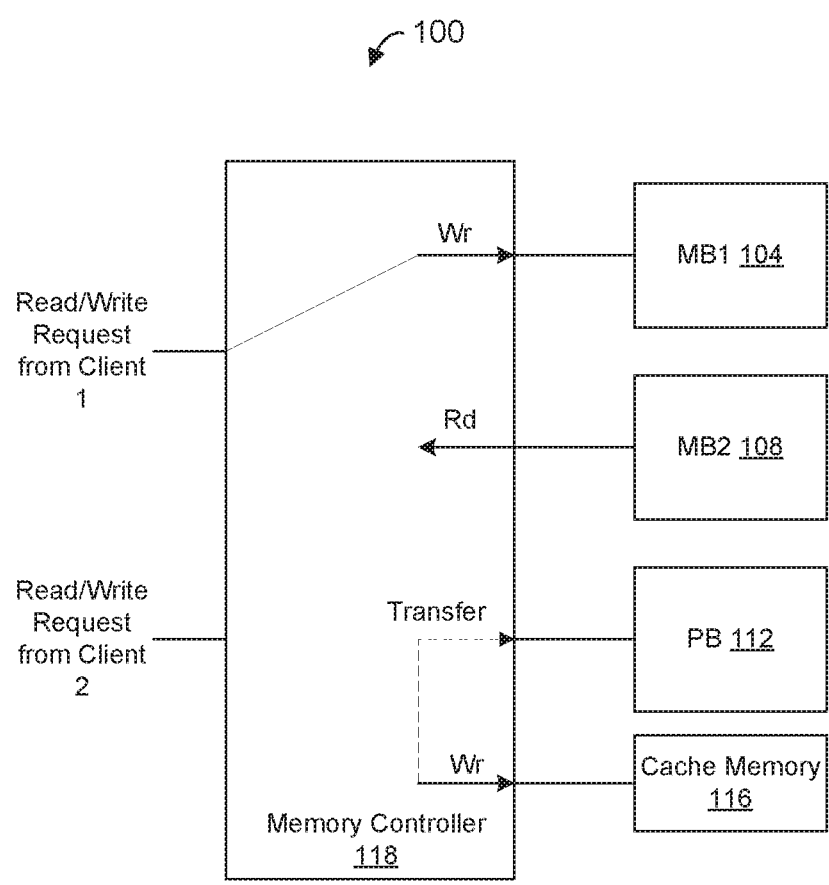
FIG. 1 is a block diagram of an example memory device, according to an embodiment.

FIG. 1 is a block diagram of an example memory device 100, according to an embodiment. The memory device 100 includes a set of memory banks 104, 108 to store content data (sometimes referred to herein as "content memory banks"). The memory device 100 also includes a memory bank 112 to store redundancy information (sometimes referred to herein as a "parity memory bank") that is suitable for use by error correction algorithms. In an embodiment, the memory banks 104, 108, and 112 are single port memories. In an embodiment, the memory device 100 is configured to facilitate increased throughput by enabling data in more than one location in either of the content memory banks 104, 108 to be read in a single clock cycle. Thus, for example, in an embodiment, in a given clock cycle, one location in one of the memories 104, 108 is read directly, while content information at a different location in the one of the memories 104, 108 is reconstructed using content information read from the other of the memories 104, 108, and redundancy information read from the parity memory bank 112.

In some embodiments, each memory bank 104, 108, 112 is structured as an array of rows. Rows of the memory bank 104, 108, 112 have respective addresses, where respective rows of memory bank (MB1) 104 correspond with respective rows of memory bank (MB2) 108 and with respective rows of memory bank (PB) 112. For example, row1 of MB1 corresponds with row1 of MB2 and row1 of PB; row2 of MB1 corresponds with row2 of MB2 and row2 of PB; etc.

In an embodiment, parity data (sometimes referred to herein as "redundancy data") in each row of PB 112 is calculated with content data in the corresponding row of MB1 and in the corresponding row of MB2. More generally, in an embodiment, parity data in an i-th row of PB 112 is calculated with content data in an i-th row of MB1 and in an i-th row of MB2, where i is an integer index. Thus, for example, if read access to MB1 is blocked in a particular clock cycle because MB1 is busy performing some other memory operation, content data from the i-th row of MB1 can effectively be read during that clock cycle by instead reading content data from the i-th row of MB2 and parity data from the i-th row of PB 112, and then reconstructing the content data from the i-th row of MB1 using the content data from the i-th row of MB2 and parity data from the i-th row of PB 112. In contrast, with a conventional single port memory, reading from a first row would block a parallel read operation from reading any row of the same memory. However, with the memory device 100, if two simultaneously received read requests (first read request and second read request) are for the same one of MB1, MB2, the first read request is granted access to the one of MB1, MB2, and the second read request is serviced by reconstructing the requested content data using data from a corresponding row from the other one of MB1, MB2, and parity data from a corresponding row of PB 112.

The parity data in PB 112 is calculated using a suitable error correction code (ECC) such that content data in one of MB1 104 or MP2 108 can be reconstructed using i) content data in the other one of MB1 104 or MP2 108, and ii) parity data in PB 112, in some embodiments. For instance, in an embodiment, parity data in the i-th row of PB 112 is calculated by exclusive OR-ing (XORing) content data in the i-th row of MB1 with content data in the i-th row of MB2. Thus, in an embodiment, content data in the i-th row of one of MB1 104 or MP2 108 can be reconstructed by XORing i) content data in the i-th row of the other one of MB1 104 or MP2 108, with ii) parity data in the i-th row of PB 112.

In an embodiment, the memory device 100 also includes one or more cache memories (e.g., registers) 116 associated with PB 112. The one or more cache memories 116 (sometimes referred to herein as "the cache memory 116" for brevity) are utilized to store parity data prior to the parity data being stored in PB 112, in an embodiment. In some embodiments, a write operation to write new content data to one of MB1 and MB2 includes temporarily storing new parity data to the cache memory 116 and later (e.g., in a subsequent clock cycle) transferring the new parity data from the cache memory 116 to PB 112 to complete the write operation. New parity data that is temporarily stored in the cache memory 116 during a write operation is then transferred to PB 112 during a subsequent write operation when subsequent new content data is being written to one of the memory banks MB1 104, MB2 108, in an embodiment. As will be explained in more detail below, temporarily storing new parity data in the cache memory 116, and transferring the new parity data from the cache memory 116 to PB 112 when subsequent new content data is being written to one of the memory banks MB1 104, MB2 108, ensures that the memory banks MB1 104, MB2 108, PB 112 will already be available for access on behalf of another operation, such as another write operation of one or more read operations, after only one clock cycle of the write operation. Thus, for example, the memory device 100 permits two simultaneous read operations to be performed after only one clock cycle of a write operation, even if the two simultaneous read operations are directed to a same one of the memory banks MB1 104, MB 108. As a result, the memory device 100 ensures that either a single write operation or two read operations (provided no concurrent write operation) can be performed in any given clock cycle, in an embodiment.

A memory controller device 118 is coupled to MB1 104, MB2 108, PB 112, and the cache memory 116, and is configured to write data to and to read data from MB1 104, MB2 108, PB 112, and the cache memory 116. In an embodiment, the memory controller device 118, MB1 104, MB2 108, PB 112, and the cache memory 116 utilize a clock signal (not shown in FIG. 1), and in an embodiment the memory device 100 supports either a write operation or two simultaneous read operations during each cycle of the clock signal. In an embodiment, the memory device 100 includes an arbitrator circuit (not shown in FIG. 1) that decides which read operation gets direct access to a particular memory bank (e.g., MB1 104, MB2 108) during a particular clock cycle when the memory controller device 118 is attempting to access the same memory bank on behalf of two simultaneous read operations. The read operation that does not receive direct access to the particular memory bank then reconstructs requested data in the particular memory bank based on content data in corresponding location in the other memory bank and corresponding parity data that is stored in either PB 112 or the cache memory 116. In an embodiment, the memory device 100 also includes a circuit (not shown in FIG. 1) that decides whether the memory controller device 118 should access parity data stored in PB 112 or should instead access parity data stored in cache memory 116 when the memory controller device 118 needs to reconstruct content data based on parity data for a read operation that does not get access to the particular memory bank.

When the memory controller device 118 receives a read request corresponding to an addressable location in MB1 104, and if the memory controller device 118 is able to gain access to MB1 104, then the memory controller device 118 services the read request by reading from the corresponding location in MB1 104. Similarly, when the memory controller device 118 receives a read request corresponding to an addressable location in MB2 108, and if the memory controller device 118 is able to gain access to MB2 108, then the memory controller device 118 services the read request by reading from the corresponding location in MB2 108. On the other hand, when the memory controller device 118 receives a read request corresponding to an addressable location in MB1 104, and if the memory controller device 118 is not able to gain access to MB1 104, then the memory controller device 118 services the read request by instead reading content information from a corresponding addressable location in MB2 108 and parity data from a corresponding addressable location in PB 112, and then reconstructs the information in the particular location in MB1 104, for example, by XORing the content information retrieved from the corresponding location in MB2 108 with the parity data retrieved from the corresponding addressable location in PB 112. Similarly, when the memory controller device 118 receives a read request corresponding to an addressable location in MB2 108, and if memory controller device 118 is not able to gain access to MB2 108, then the memory controller device 118 services the read request by instead reading content information from a corresponding addressable location in MB1 104 and parity data from a corresponding addressable location in PB 112, and then reconstructs the information in the particular location in MB2 108 by XORing the content information retrieved from the corresponding location in MB1 104 with the parity data retrieved from the corresponding location in PB 112.

Figure 2:
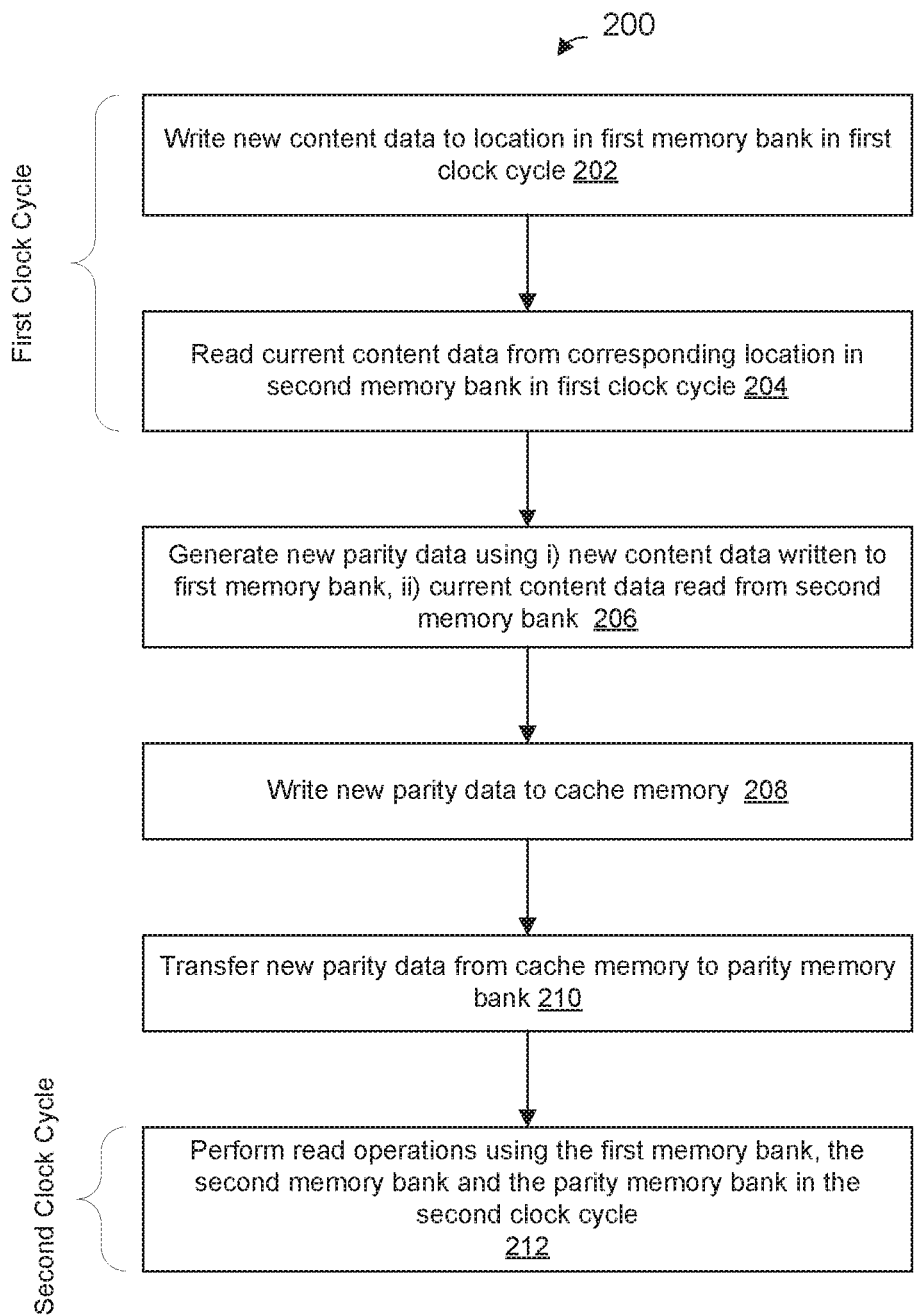
FIG. 2 is a flow diagram of an example method of writing data to the memory device of FIG. 1, according to an embodiment.

FIG. 2 is a flow diagram of an example method 200 for performing, with a memory device having multiple memory banks, a write operation in a manner that permits other operations, such as another write operation or multiple simultaneous read operations, to be performed in a next clock cycle that immediately follows an initial clock cycle of the write operation, according to an embodiment. In some embodiments, the method 200 is implemented by the memory device 100 of FIG. 1. For example, the memory controller device 118 of the memory device 100 is configured to implement the method 200, in one such embodiment. In another embodiment, the method 200 is implemented at least partially by another suitable component of the memory device 100, or is implemented by a suitable memory device different from the memory device 100. Similarly, the memory device 100 (e.g., the memory controller device 118) is configured to implement a suitable method different from the method 200 for performing write operations, in an embodiment. For ease of explanation, the method 200 is described with reference to the memory device 100 of FIG. 1.

The method 200 is described, merely for explanatory purposes, in the context of performing a write operation to write new content data to a particular location in MB1 104 (e.g., a particular row of MB1 104 having an associated address). In other scenarios, a similar technique is utilized to write new content data to a particular location in MB2 108.

The method 200 includes writing new content to MB1 104. Because new content data is being written to MB1 104, however, corresponding new parity data also must be calculated and then stored to PB 112, in an embodiment, so that multiple simultaneous read accesses to the memory banks MB1 104, MB2 108 can be suitably serviced in a single clock cycle. In prior memory devices structured as the memory device 100, in a first clock cycle of a write operation, old content data was read from location in MB1 104 that was to be overwritten by the new content data, and old parity data was read from the corresponding location in the PB 112. The new parity data was then generated based on i) the new content data, ii) the old content data read from MP1 014, and iii) the old parity data read from PB 112. Then, in a second clock cycle, the new content data was written to MB1 104, and the new parity data was written to PB 112. Thus, in such prior memory devices, the new content data was not available in MB1 104 until after the second clock cycle of the write operation. Moreover, in such prior memory devices, at least some of the operations supported by the memory device could not be performed during the second clock cycle of the write operation. For example, a read operation to read content data from MB1 104, or multiple simultaneous read operations to read content data from a particular one of the memory banks MB1 104, MB2 108, could not be performed during the second clock cycle of the write operation because both MB1 104 and PB 112 were being accessed on behalf of the write operation during the second clock cycle of the write operation. As another example, new content data could not be written to either MB1 104 or MB2 108 during the second clock cycle of the write operation. On the other hand, a write operation performed according to the method 200 permits a subsequent write operation, or up to two simultaneous read operations, to be performed after only one clock cycle of a current write operation, in an embodiment. Thus, a network device implementing the method 200 ensures that either a write request or two simultaneous read requests can be serviced in any given clock cycle, in an embodiment.

At block 202, new content data is written to an addressable location in a first memory bank. For example, the memory controller device 118 writes new content data to an addressable location in the MB1 104, in an embodiment. In an embodiment, the memory controller device 118 writes the new content data to MB 104 in response to receiving a write request from a client device. The write request includes the new content data, and indicates that the new content data is to be written to the addressable location in the MB1 104 (e.g., includes an indication of the addressable location in the MB1 104), in an embodiment. In an embodiment, the new content data is written to the addressable location in the first memory bank during a first (e.g., an initial) clock cycle of the write operation. Thus, the new content data is available in MB1 104 after the initial clock cycle of the write operation, in an embodiment.

At block 204, current content data is read from a location in a second memory bank corresponding to the location in the first memory bank to which the new content data is written at block 202. For example, the memory controller device 118 reads current content data from an addressable location in the MB2 108 corresponding to the addressable location in the MB1 104 to which new content data is written at block 202, in an embodiment. In an embodiment, block 204 is performed concurrently (e.g., in a same clock cycle) with block 202. For example, in an embodiment, the memory controller 118 writes new content data to the location in the first content memory bank MB1 104, and reads current content data from the corresponding location in the second content memory bank MB2 108, during the initial clock cycle of the write operation.

At block 206, new parity data is generated based on (i) the new content data written to the first memory bank at block 202 and (ii) the current content data read from corresponding location in the second memory bank at block 204. In an embodiment, the memory controller device 118 generates the new parity data. In another embodiment, another suitable component (e.g., a processor device) of the memory device 100 generates the new parity data. In an embodiment, the new parity data is calculated by XOR-ing together (i) the new content data written to the first content memory bank at block 202 and (ii) the current content data read from the corresponding location in the second content memory bank at block 204.

At block 208, the new parity data generated at block 206 is written to a cache memory associated with the parity memory bank. For example, the memory controller device 118 writes the new parity data to the cache memory 116, in an embodiment. In an embodiment, block 208 also includes setting an indicator that the corresponding location in the parity bank should not be accessed. For example, the memory controller device 118 sets the indicator, in an embodiment. In various embodiments, the indicator includes an address of the corresponding location in the parity memory bank, a row number corresponding to the location in the parity memory bank, an identifier of a corresponding element in a memory array of the parity memory bank, etc. In some embodiments, the indicator is included in the cache memory 116. For example, in an embodiment, a first location in the cache memory 116 is used to store the indicator, and a second location in the cache memory 116 is used to store the new parity data. In another embodiment, the indicator is stored in a suitable memory device (e.g., a register) separate from the cache memory 116.

After block 208 is performed, the new content data can be reconstructed by the memory controller device 118 even though the entire write procedure has not yet been completed, e.g., because the parity data in PB 112 is not yet updated, in an embodiment. For example, if the memory controller device 118 is blocked from accessing MB1 104 because another concurrent read operation is granted access to MB1 104, the new parity data is available to the memory controller device 118 to reconstruct the new content data now in MB1 104.

At block 210, the parity data is transferred from the cache memory associated with the parity memory bank. For example, the memory controller device 118 transfers the new parity data from the cache memory 116 to an addressable location in the PB 112 that corresponds to be addressable location in MB1 104 to which the new content data was written at block 202, in an embodiment. In an embodiment, the parity data is transferred from the cache memory to the parity memory bank in a subsequent clock cycle in which subsequent new content data is being written to one of the content memory banks MB1 104 and MB2 108. For example, the memory controller device 118 transfers the parity data from the cache memory 116 to the corresponding location in the PB 112 concurrently with (e.g., in a same clock cycle) writing subsequent new content data to MB1 104 or MB2 108, in an embodiment.

As discussed above, writing new content data to MB1 104, MB2 108 generally involves writing the new content data to MB1 104, MB2 108 and, in a same clock cycle, reading current content data from the other one of the MB1 104, MB2 108 such that new parity data can be calculated and subsequently written to the parity memory bank PB 112, in an embodiment. Thus, the parity memory bank PB 112, itself, need not be accessed during the initial clock cycle of a write operation at which new content data is written to one of the MB1 104, MB2 108, in an embodiment. On the other hand, during a clock cycle in which multiple read requests are being serviced by the memory device 100, the parity memory bank PB 112 is needed for servicing one of the multiple read request in some situations, for example when the multiple read requests are directed to a same one of the content memory banks MB1 104, MB2 108, in an embodiment. Thus, transferring parity data, generated during a previous write operation, from the cache memory 116 to the parity memory bank PB 112 only when subsequent new content data is being written to one of the content memory banks MB1 014, MB2 108 (i.e., during an initial clock cycle of a subsequent write operation) ensures that the parity memory bank PB 112 will be available for access on behalf of read operations in any clock cycle during which new content data is not being written to the content memory banks, in an embodiment. Thus, for example, in an embodiment in which transfer of parity data from the cache memory 116 to the parity bank PB 112 is restricted to clock cycles during which new content data is being written to the content memory banks MB1 104, MB2 108, the parity memory bank PB 112 will be available for access on behalf of a read operation if the access is needed for reconstructing requested content data for the read operation.

In an embodiment, after blocks 202 and 204 are performed during the initial clock cycle of the write operation, MB1 104, MB2 108 and PB 112 become available for access, on behalf of other operations, in a next clock cycle that immediately follows the initial clock cycle of the write operation. Thus, for example, because both MB1 104 and MB2 104 are available for access on behalf of other operations, a subsequent write operation can be initiated in a next clock cycle that immediately follows the initial clock cycle of the current write operation. For example, the subsequent write operation is initiated by writing, in the next clock cycle that immediately follows the initial clock cycle of the write operation, new content data to one of the MB1 104, MB2 108, in an embodiment.

As another example, because MB1 104, MB2 108 and PB 112 are available for access by other operations in a next clock cycle that immediately follows the first clock cycle of the write operation, two simultaneous read operations can be performed in a next clock cycle that immediately follows the initial clock cycle of the write operation. Thus, in an embodiment, the method 200 includes block 212 which comprises, performing, during a second cycle that immediately follows the first clock cycle, two simultaneous read operations directed to a particular one of the content memory banks. In an embodiment, the two simultaneous read operations directed to the particular one of the content memory banks are performed by reading, for a first one of the read operations, requested content data directly from the particular content memory bank, and reconstructing, for a second one of the read operations, requested content data using (i) content data read from the other content memory bank and (ii) parity data selectively read from either the parity memory bank or the cache memory associated with the parity memory bank as described above, for example. As just an example, at block 212, the memory controller device 118 services, in the second clock cycle that immediately follows the first clock cycle, a first read request directed to a first location in MB1 104 and a second read request directed to a second location in MB1 104, in an embodiment. The second location is the same location as the first location or is a location different from the first location, in various embodiments. The memory controller device 118 services the first read request by reading, in the second clock cycle, the requested content data from the first location in MB1 104 and services the second read request by reading, also in the second clock cycle, (i) content data from a location in MB2 108 that corresponds to second location in MB1 104 and (ii) parity data from a location in PB 112 corresponding to the second location in MB1 104 or from the cache memory 116, and reconstructing the requested content data at the second location in MB1 104 using the content data read from MB2 108 and the parity data read from PB 112 or the cache memory 116, in an embodiment.

It should be noted that although the memory device 100 illustrated in FIG. 1 allows two simultaneous read requests to be serviced using parity data in one parity memory bank in a given clock cycle, the memory device 100 allows more than two simultaneous read requests to be serviced in a given clock cycle in some embodiments. For example, the memory device 100 includes more than one parity memory bank and supports more than two simultaneous read requests in a given clock cycles, in some embodiments. In some such embodiments, methods similar to the method 200 implemented by the memory device 100 ensure that servicing of either one write requests or the more than two simultaneous read requests can be performed in any given clock cycle.

Figure 3:
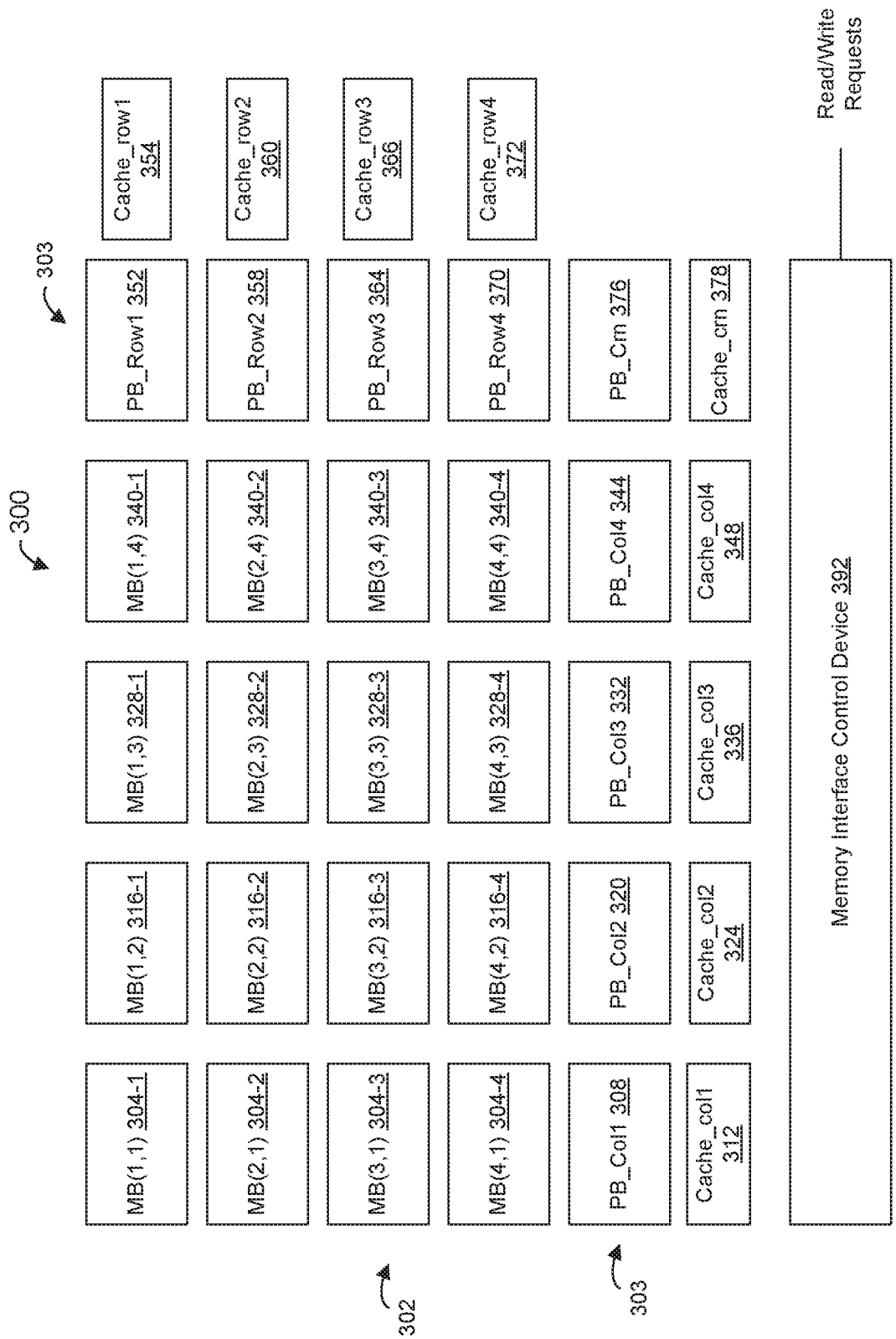
FIG. 3 is a block diagram of another example memory device, according to an embodiment.

FIG. 3 is a block diagram of another example memory device 300 configured as a two-dimensional array of memory banks, according to an embodiment. For ease of explanation, a first dimension of the array is referred to in the description below as "columns" and a second dimension of the array is referred to as "rows". Use of the terms "row", "rows", "column", and "columns" is not meant to connote a particular spatial orientation of the memory device 300, but merely is for ease in distinguishing between the first dimension and the second dimension in the description below.

The memory device 300 includes a two dimensional array of memory banks 302 to store content data (sometimes referred to herein as "content memory banks"). The memory device 300 also includes a plurality of memory banks 303 to store parity data (sometimes referred to herein as a "parity memory banks"). A first column of content memory banks 304 (sometimes referred to as "MB(i,1)", for i=1, 2, 3, or 4) is associated with a corresponding parity memory bank 308 (sometimes referred to as "PB_Col1"). One or more cache memories (e.g., registers) 312 (sometimes referred to as "Cache_col1" or "the cache memory 312" for brevity) are associated with the parity memory bank 308. A second column of content memory banks 316 (sometimes referred to as "MB(i,2)", for i=1, 2, 3, or 4) is associated with a corresponding parity memory bank 320 (sometimes referred to as "PB_Col2"). One or more cache memories (e.g., registers) 324 (sometimes referred to as "Cache_col2" or "the cache memory 324" for brevity) are associated with the parity memory bank 320. A third column of content memory banks 328 (sometimes referred to as "MB(i,3)", for i=1, 2, 3, or 4) is associated with a corresponding parity memory bank 332 (sometimes referred to as "PB_Col3"). One or more cache memories (e.g., registers) 336 (sometimes referred to as "Cache_col3" or "the cache memory 336" for brevity) are associated with the parity memory bank 332. A fourth column of content memory banks 340 (sometimes referred to as "MB(i,4)", for i=1, 2, 3, or 4) is associated with a corresponding parity memory bank 344 (sometimes referred to as "PB_Col4"). One or more cache memories (e.g., registers) 348 (sometimes referred to as "Cache_col4" or "the cache memory 348" for brevity) are associated with the parity memory bank 344. In an embodiment, the memory banks 302 are each configured as a single port memory bank supporting only a single memory access operation in a given clock cycle, but having a plurality of separately addressable memory locations. In other embodiments, memory banks are multiport memories configured to support two or more memory operations in a single clock cycle. In such multiport memories embodiments, content is reconstructed in a similar manner as described above with respect to single port memories using data from other memory banks and the parity memory bank when more memory operations than the number ports of a memory bank is to be performed in a given clock cycle.

A parity memory bank 352 (sometimes referred to as "PB_Row1") is associated with a first row of content memory banks comprising MB(1,1), MB(1,2), MB(1,3), and MB(1,4). One or more cache memories (e.g., registers) 354 (sometimes referred to as "Cache_row1" or "the cache memory 354" for brevity) are associated with the parity memory bank 352. A parity memory bank 358 (sometimes referred to as "PB_Row2") is associated with a second row of content memory banks comprising MB(2,1), MB(2,2), MB(2,3), and MB(2,4). One or more cache memories (e.g., registers) 360 (sometimes referred to as "Cache_row2" or "the cache memory 360" for brevity) are associated with the parity memory bank 358. A parity memory bank 364 (sometimes referred to as "PB_Row3") is associated with a third row of content memory banks comprising MB(3,1), MB(3,2), MB(3,3), and MB(3,4). One or more cache memories (e.g., registers) 366 (sometimes referred to as "Cache_row3" or "the cache memory 366" for brevity) are associated with the parity memory bank 364. A parity memory bank 370 (sometimes referred to as "PB_ROW4") is associated with a fourth row of content memory banks comprising MB(4,1), MB(4,2), MB(4,3), and MB(4,4). One or more cache memories (e.g., registers) 372 (sometimes referred to as "Cache_ROW4" or "the cache memory 372" for brevity) are associated with the parity memory bank 370.

A parity memory bank 376 (sometimes referred to as "PB_Crn", or "the corner parity memory bank 376") is associated with a column of parity memory banks comprising PB_ROW1, PB_ROW2, PB_ROW3, and PB_ROW4. One or more cache memories (e.g., registers) 378 (sometimes referred to as "Cache_crn" or "the cache memory 378" for brevity) are associated with the parity memory bank 376.

In some embodiments, each memory bank (MB) illustrated in FIG. 3 is structured as a single port memory array, where respective elements of the memory array correspond with i) respective elements of the other memory arrays in the same column, ii) respective elements of the parity memory array corresponding to the same column, iii) respective elements of the other memory arrays in the same row, and iv) respective elements of the parity memory array corresponding to the same row. For example, respective elements MB(1,1) correspond with i) respective elements of the other memory arrays in the same column (e.g., MB(2,1), MB(3,1), and MB(4,1)), ii) respective elements of the parity memory bank PB_Col1, iii) respective elements of the other memory arrays in the same row (e.g., MB(1,2), MB(1,3), and MB(1,4)), and iv) respective elements of the parity memory bank PB_Row1.

In an embodiment, parity data in each array element of PB_Col1 is calculated with content data in the corresponding array elements of MB(1,1), MB(2,1), MB(3,1), and MB(4,1). In other words, in an embodiment, parity data in an i-th array element of PB_Col1 is calculated with content data in an i-th array elements of MB(1,1), MB(2,1), MB(3,1), and MB(4,1), where i is an integer index.

The parity data in PB_Col1 is calculated using a suitable ECC such that content data in one of MB(1,1), MB(2,1), MB(3,1), and MB(4,1) can be reconstructed using i) content data in the other ones of MB(1,1), MB(2,1), MB(3,1), and MB(4,1), and ii) parity data in PB_Col1, in some embodiments. For instance, in an embodiment, parity data in the i-th array element of PB_Col1 is calculated by XORing together content data in the i-th array elements of MB(1,1), MB(2,1), MB(3,1), and MB(4,1). Thus, in an embodiment, content data in the i-th element of one of MB(1,1), MB(2,1), MB(3,1), and MB(4,1) can be reconstructed by XORing i) content data in the i-th elements of the other ones of MB(1,1), MB(2,1), MB(3,1), and MB(4,1), with ii) parity data in the i-th element of PB_Col1.

In other embodiments, other suitable ECCs are utilized (e.g., such as Reed-Solomon).

In a similar manner, the parity data in PB_Col2 is calculated using a suitable ECC such that content data in one of MB(1,2), MB(2,2), MB(3,2), and MB(4,2) can be reconstructed using i) content data in the other ones of MB(1,2), MB(2,2), MB(3,2), and MB(4,2), and ii) parity data in PB_Col2, in some embodiments. The parity data in PB_Col3 is calculated using a suitable ECC such that content data in one of MB(1,3), MB(2,3), MB(3,3), and MB(4,3) can be reconstructed using i) content data in the other ones of MB(1,3), MB(2,3), MB(3,3), and MB(4,3), and ii) parity data in PB_Col3, in some embodiments. The parity data in PB_Col4 is calculated using a suitable ECC such that content data in one of MB(1,4), MB(2,4), MB(3,4), and MB(4,4) can be reconstructed using i) content data in the other ones of MB(1,4), MB(2,4), MB(3,4), and MB(4,4), and ii) parity data in PB_Col4, in some embodiments.

In a similar manner, the parity data in PB_Row1 is calculated using a suitable ECC such that content data in one of MB(1,1), MB(1,2), MB(1,3), and MB(1,4) can be reconstructed using i) content data in the other ones of MB(1,1), MB(1,2), MB(1,3), and MB(1,4), and ii) parity data in PB_ROW1, in some embodiments. The parity data in PB_ROW2 is calculated using a suitable ECC such that content data in one of MB(2,1), MB(2,2), MB(2,3), and MB(2,4) can be reconstructed using i) content data in the other ones of MB(2,1), MB(2,2), MB(2,3), and MB(2,4), and ii) parity data in PB_ROW2, in some embodiments. The parity data in PB_Row3 is calculated using a suitable ECC such that content data in one of MB(3,1), MB(3,2), MB(3,3), and MB(3,4) can be reconstructed using i) content data in the other ones of MB(3,1), MB(3,2), MB(3,3), and MB(3,4), and ii) parity data in PB_ROW3, in some embodiments. The parity data in PB_Row4 is calculated using a suitable ECC such that content data in one of MB(4,1), MB(4,2), MB(4,3), and MB(4,4) can be reconstructed using i) content data in the other ones of MB(4,1), MB(4,2), MB(4,3), and MB(4,4), and ii) parity data in PB_ROW4, in some embodiments.

In a similar manner, the parity data in PB_Crn is calculated using a suitable ECC such that data in one of PB_ROW1, PB_ROW2, PB_ROW3, and PB_Row4 can be reconstructed using i) data in the other ones of PB_ROW1, PB_ROW2, PB_ROW3, and PB_ROW4, and ii) parity data in PB_Crn, in some embodiments. The parity data in PB_Crn can also be used to reconstruct data in one of PB_Col1, PB_Col2, PB_Col3, and PB_Col4, in an embodiment. Data in one of PB_Col1, PB_Col2, PB_Col3, and PB_Col4 can be reconstructed using i) data in the other ones of PB_Col1, PB_Col2, PB_Col3, and PB_Col4, and ii) parity data in PB_Crn, in some embodiments.

Figure 4:
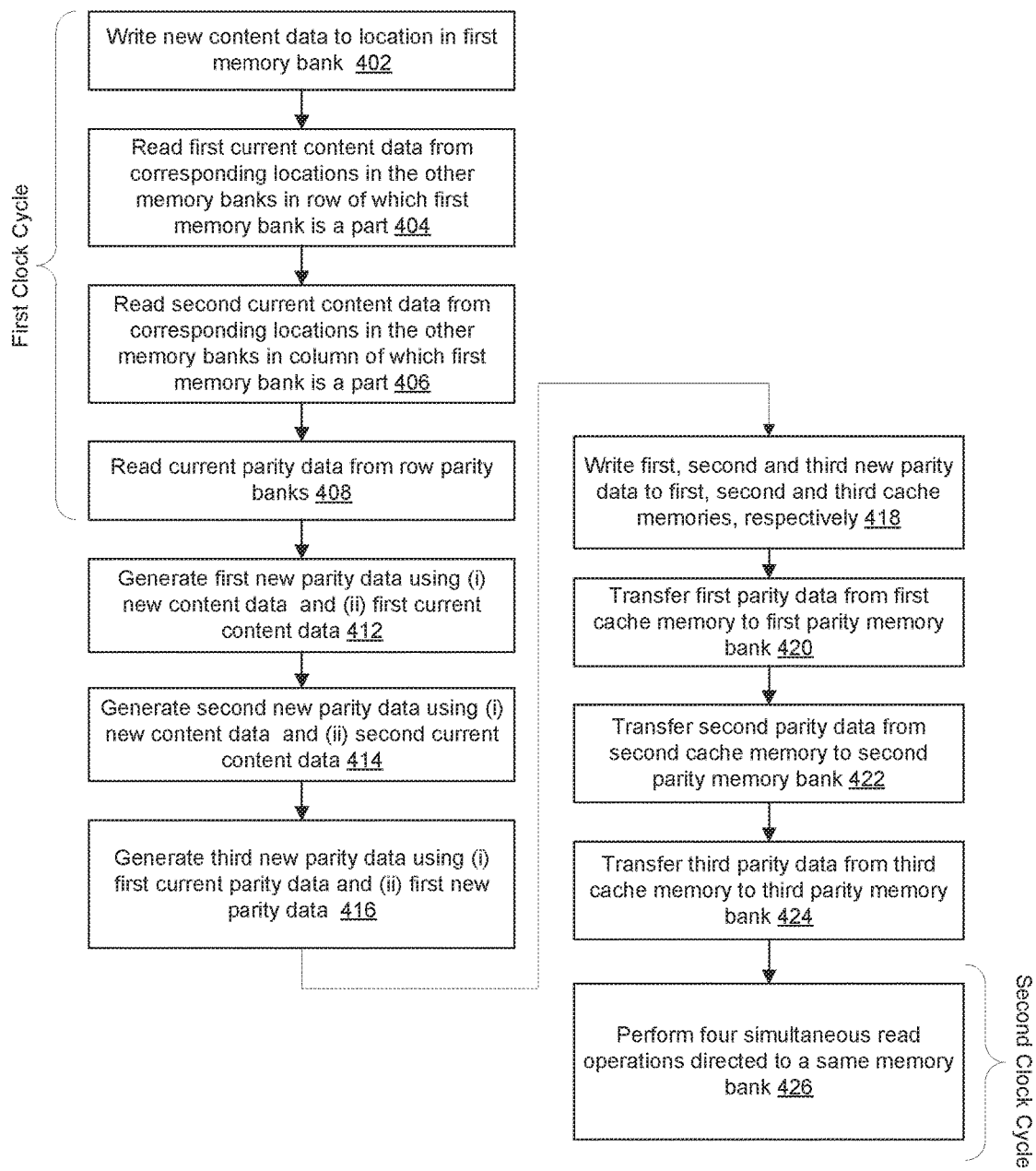
FIG. 4 is a flow diagram of an example method of writing data to the memory device of FIG. 3, according to an embodiment.

In an embodiment, the two dimensional arrangement of content memory banks and parity memory banks illustrated in FIG. 4 allows four requests to access content data from MB(1,1), for example, to be simultaneously serviced. As an illustrative example, while a first request to read content data from MB(1,1) is serviced by physical access to MB(1,1), a second request to read content data from MB(1,1) is simultaneously serviced by accessing corresponding data from MB(2,1), MB(3,1), MB(4,1), and PB_Col1, and then reconstructing the requested content data from MB(1,1) with an ECC decoding procedure and the corresponding data from MB(2,1), MB(3,1), MB(4,1), and PB_Col1. Additionally, a third request to read content data from MB(1,1) is simultaneously serviced by accessing corresponding data from MB(1,2), MB(1,3), MB(1,4), and PB_ROW1, and then reconstructing the requested content data from MB(1,1) with an ECC decoding procedure and the corresponding data from MB(1,2), MB(1,3), MB(1,4), and PB_Row1. Also, a fourth request to read content data from MB(1,1) is simultaneously serviced by reconstructing corresponding data from MB(1,2), MB(1,3), MB(1,4), and PB_ROW1, and then reconstructing the requested content data from MB(1,1) with an ECC decoding procedure and the corresponding reconstructed data from MB(1,2), MB(1,3), MB(1,4), and PB_Row1. The corresponding data from MB(1,2) is reconstructed by accessing corresponding data from MB(2,2), MB(3,2), MB(4,2), and PB_Col2, and then reconstructing the content data from MB(1,2) with an ECC decoding procedure and the corresponding data from MB(2,2), MB(3,2), MB(4,2), and PB_Col2. The corresponding data from MB(1,3) is reconstructed by accessing corresponding data from MB(2,3), MB(3,3), MB(4,3), and PB_Col3, and then reconstructing the content data from MB(1,3) with an ECC decoding procedure and the corresponding data from MB(2, 3), MB(3,3), MB(4,3), and PB_Col3. The corresponding data from MB(1,4) is reconstructed by accessing corresponding data from MB(2,4), MB(3,4), MB(4,4), and PB_Col4, and then reconstructing the content data from MB(1,4) with an ECC decoding procedure and the corresponding data from MB(2,4), MB(3,4), MB(4,4), and PB_Col4. The corresponding data from PB_Row1 is reconstructed by accessing corresponding data from PB_ROW2, PB_ROW3, PB_ROW4, and PB_Crn, and then reconstructing the data from PB_Row1 with an ECC decoding procedure and the corresponding data from PB_ROW2, PB_ROW3, PB_ROW4, and PB_Crn.

A memory controller device 392 handles read and write requests from a plurality of clients (e.g., client 1, client 2, client 3, and client 4), not shown in FIG. 3. The memory controller device 392 is coupled to each of the content memory banks 302, each of the parity memory banks 303 and to each of the cache memories associated with the parity memory banks 303, in an embodiment.

As briefly discussed above, parity data is sometimes stored in the cache memories 312, 324, 336, 348, 354, 360, 366, 372, and 378 prior to the parity data being stored in PB_Col1, PB_Col2, PB_Col3, PB_Col4, PB_ROW1, PB_ROW2, PB_ROW3, PB_ROW4, and PB_Crn, respectively. Accordingly, the memory controller device 392 includes a circuit (not shown in FIG. 3) configured to determine whether, when the memory controller device 392 is to read from one of the parity memory banks PB_Col1, PB_Col2, PB_Col3, PB_Col4, PB_ROW1, PB_ROW2, PB_ROW3, PB_ROW4, and PB_Crn, the memory controller device 392 should instead read from the associated cache memory 312, 324, 336, 348, 354, 360, 366, 372, and 378.

Operation of the memory controller device 392 will now be described with reference to the first column of memory banks comprising MB(1,1) 304-1, MB(2,1) 304-2, MB(3,1) 304-3, MB(4,1) 304-4. The memory controller device 392 is configured to operate in a similar manner to write data to and to read data from memory banks in second, third, and fourth columns of the memory banks 302, in an embodiment.

When the memory controller device 392 receives two read requests corresponding to different ones of MB(1,1), MB(2,1), MB(3,1), and MB(4,1), then the memory controller device 392 services the two read request by reading from the different ones of MB(1,1), MB(2,1), MB(3,1), and MB(4,1). On the other hand, when the memory controller device 392 receives two read requests corresponding to the same one of MB(1,1), MB(2,1), MB(3,1), and MB(4,1), then the memory controller device 392 services a first read request by reading from the one of MB(1,1), MB(2,1), MB(3,1), and MB(4,1). The memory controller device 392 services a second read request by reading content information from corresponding locations in the other ones of MB(1,1), MB(2,1), MB(3,1), and MB(4,1), and parity data from a corresponding location in PB_Col1. Then, the memory controller device 392 reconstructs the information by XORing the content information retrieved from the corresponding locations in the other ones of MB(1,1), MB(2,1), MB(3,1), and MB(4,1), with the parity data from the corresponding location in PB_Col1, in an embodiment.

The memory controller device 392 is configured to perform a write operation in a manner that ensures that (i) another write operation or (ii) up to four simultaneous read operations directed to any one(s) of the content memory banks 302 can be performed in a clock cycle that immediately follows a first clock cycle of the write operation. In prior art devices having a structure similar the memory device 300 of FIG. 3, in various embodiments, at least some of four simultaneous read requests would be blocked during multiple clock cycles that were used to write new content to one of the content memory banks MB, and to update parity data in one of the column parity memory banks 308, 320, 332, 344, in one of the row parity memory banks 352, 358, 364, 370, and the corner parity bank 376. For instance, writing new content to MB(3,1) also entails, in an embodiment, updating parity data in PB_Col1, in PB_ROW3, and PB_Crn to reflect the new content data. Further, updating the parity data in PB_Col1, in PB_ROW3, and PB_Crn entails, in an embodiment, using i) old content data in MB(3,1) and ii) old parity data in PB_Col1, in PB_ROW3, and PB_Crn to calculate the new parity data. Thus, a prior art device having a structure similar to the memory device 100 of FIG. 1, for example, read old content data from MB(3,1) in a first clock cycle, and read old parity data (corresponding to the old content data) from PB_Row3 also in the first clock cycle. Also, the prior art device having the structure similar to the memory device 100 of FIG. 1, for example, read old parity data from PB_Col1 in a second clock cycle, and used column interface 384-5 to read old parity data (corresponding to the old content data) from PB_Crn also in the second clock cycle. The new content data, the old content data from MB(3,1), and the old parity data from PB_Col1, in PB_Row3, and PB_Crn were then used to calculate the new parity data. In a second clock cycle, the memory controller device 392 wrote (i) the new content data to MB(3,1), and (ii) the new parity data to PB_Col1, in PB_Row3, and PB_Crn. Thus, in such prior device, new content data written to MB(3,1) was not available in MB(3,1) until the second clock cycle of the write operation. Moreover, in such prior device, four concurrent read operations to read content data from the memory banks 302 could not be guaranteed until after the second clock cycle because one or more of the memory banks 302 were being accessed on behalf of the write operation during the second clock cycle of the write operation. Thus, for example, four concurrent read operations directed to a same memory banks 302 could not be performed during either the first clock cycle or the second clock cycle of the write operation. Alternatively, in other prior memory devices having a structure similar the memory device 300 of FIG. 3, in various embodiments, a write operation would be performed in parts over multiple clock cycles in a manner that ensures that some concurrent read operations, but less that a maximum of four read operations, could be performed during each of the multiple clock cycles of the write operation. On the other hand, as explained in more detail below, the memory device 300 operating according to techniques described herein ensures that up to four read operations can be performed in a next clock cycle that immediately follows an initial clock cycle of a write operation, in at least some embodiments.

FIG. 4 is a flow diagram of an example method 400 of performing a write operation that ensures that up to four concurrent read operations can be performed after an initial clock cycle of the write operation, according to an embodiment. In some embodiments, the method 400 is implemented by the memory device 300 of FIG. 3. For example, the memory controller device 392 of the memory device 300 is configured to implement the method 300, in one such embodiment. In another embodiment, the method 300 is implemented at least partially by another suitable component of the memory device 300, or is implemented by a suitable memory device different from the memory device 300. Similarly, the memory device 300 (e.g., the memory controller device 392) is configured to implement a suitable method different from the method 400 for writing new content data to the memory banks, in an embodiment. For ease of explanation, the method 400 is described with reference to the memory controller device 392 of the memory device 300.

The method 400 is described, merely for explanatory purposes, in the context of the memory controller device 392 performing a write operation to write content data to a particular addressable location in MB(2,1) (e.g., a particular row of MB(2,1) having an associated address) in a first column of the memory banks 302. In other scenarios, a similar technique is utilized to perform a write operation to write content data to a particular addressable location in one of other memory banks in the first column of memory banks 302, such as the MB(1,1), the MB(3,1), or the MB(4,1)), or to a particular addressable location in a memory bank 302 in a column other than first column (e.g., the second column, the third column or the fourth column) of the memory banks 302.

The method 400 includes writing new content data to a location in MB(2,1). Because new content data is being written to MB(2,1), corresponding new parity data also must be calculated and then stored to PB_Col1, PB_Row2, and PB_Crn, in an embodiment. The new parity data to be stored in PB_Col1 is calculated using (i) the new content data written to the location in MB(2,1) and (ii) current content data in corresponding locations in the other content memory banks 302 in the column of which MB(2,1) is a part (i.e., MB(1,1), MB(3,1) and MB (4,1)), in an embodiment. The new parity data to be stored in PB_Row2 is calculated using (i) the new content data written to the location in MB(2,1) and (ii) current content data in corresponding locations in the other content memory banks 302 in the row of which MB(2,1) is a part (i.e., MB(2,2), MB(2,3) and MB (2,4)), in an embodiment. The new parity data to be stored in PB_Crn is calculated using (i) the new party data to be stored in PB_Row2 and (ii) the current parity data in corresponding locations in the other ones of the row parity banks (i.e., PB_Row1, PB_Row3, PB_Row4, in an embodiment. The new parity data to be stored in PB_Crn is calculated using (i) the new parity data to be stored in PB_Col1 and (ii) current parity data in corresponding locations the other ones of the column parity banks (i.e., PB_Col2, PB_Col3, PB_Col4), in another embodiment.

Referring again to FIGS. 1 and 2, the memory device 100 included one parity memory and thus the method 200 entailed updating the one parity memory when new content data was written. With the two-dimensional structure of the memory device 300 of FIG. 3, however, each content memory bank corresponds with a column having an associated column parity memory bank, a row having an associated row parity memory bank, and a corner memory bank. Thus, unlike the method 200 of FIG. 2, the method 400 entails updating three parity memory banks each time new content memory is written to a content memory bank.

At block 402, new content data is written to an addressable location in a first content memory bank. For example, the memory controller device 392 writes new data to an addressable location in the MB(2,1), in an embodiment. In an embodiment, the memory controller device 392 writes the new content data to the MB(2,1) in response to receiving a write request from a client device, wherein the write request includes the new content data and indicates that the new content data is to be written to the addressable location in the MB(2,1).

At block 404, concurrently (e.g., in a same clock cycle) with the new content data being written to the first content memory bank at block 402, first current content data is read from locations in the other content memory banks, in the row of content memory banks of which the first content memory bank is a part, corresponding to the location in the first content memory bank to which the new content data is written at block 402. For example, in an embodiment, the memory controller device 392 reads current content data from locations in the MB(2,2), MB(2,3), MB(2,4) corresponding to the location in the MB(2,1) to which the new content data is written at block 402.

At block 406, also concurrently (e.g., in a same clock cycle) with the new content data being written to the first content memory bank at block 402, second current content data is read from locations in the other content memory banks, in the column of content memory banks of which the first content memory bank is a part, corresponding to the location in the first content memory bank to which the new content data is written at block 402. For example, in an embodiment, the memory controller device 392 reads current content data from locations in MB(1,1), MB(3,1), MB(4,1) corresponding to the location in MB(2,1) to which the new content data is written at block 402.

At block 408, also concurrently (e.g., in a same clock cycle) with the new content data being written to the first content memory bank at block 402, current parity data is read from locations, in a first set of parity memory banks, corresponding to the location in the first content memory bank to which the new content data is being written at block 402. In an embodiment, the current parity data is read from row parity memory banks. For example, in an embodiment, the memory controller device 392 reads the current parity data from locations in PB_Row1, PB_Row3 and PB_Row4 corresponding to the location in MB(2,1) to which the new content data is written at block 402. It should be noted that current parity data in PB_Row2 corresponding to the row of which MB(2,1) is a part is not needed for updating parity data in PB_Crn because new parity data to be stored in PB_Row2 will be used in updating parity data in PB_Crn, in an embodiment. Accordingly, block 408 does not include reading current parity data from PB_Row2, in an embodiment.

In another embodiment, current parity data is read in a similar manner from column parity memory banks rather than row parity memory banks.

At block 412, first new parity data to be written to a first parity memory bank is generated. In an embodiment, the first new parity data is to be written to a row parity memory bank that corresponds to the row of which the first content memory bank is a part. In an embodiment, the first new parity data is generated using (i) the new content data written to first content memory bank at block 402 and (ii) first current content data read at block 404. For example, in an embodiment, the memory controller device 392 generates the first new parity data by XORing together (i) the new content data written to first content memory bank at block 402 and (ii) first current content data read at block 404.

At block 414, second new parity data to be written to a second parity memory bank is generated. In an embodiment, the second new parity data is to be written to a column parity memory bank that corresponds to the column of which the first content memory bank is a part. In an embodiment, the second new parity data is generated using (i) the new content data written to first content memory bank at block 402 and (ii) second current content data read at block 406. For example, in an embodiment, the memory controller device 392 generates the second new parity data by XORing together (i) the new content data written to first content memory bank at block 402 and (ii) second current content data read at block 406.

At block 416, third new parity data to be written to a third parity memory bank is generated. In an embodiment, the third new parity data is to be written to the corner parity memory bank. In an embodiment, the third new parity data is generated using (i) the current parity data read at block 408 and (ii) the first new parity data generated at block 412. For example, in an embodiment, the memory controller device 392 generates the third new parity data by XORing together (i) the current parity data read at block 408 and ii) the first new parity data generated at block 412.

At block 418, the first new parity data generated at block 412, the second new parity data generated at block 414, and the third new parity data generated at block 416 are written, respectively, to first, second and third cache memories corresponding, respectively, to the first, the second and the third parity memory banks. For example, in an embodiment, the memory controller device 392 writes the first new parity data generated at block 412 to Cache_Row2, writes the second new parity data generated at block 414 to Cache_Col1, and write the third new parity data generated at block 416 to Cache_Crn.

At block 420, first new parity data is transferred from the first cache memory to location in the first parity memory bank corresponding to the location to which new content data was written at block 402. In an embodiment, the memory controller device 392 transfers the first new parity data from the Cache_ROW2 to location in PB_ROW2 corresponding to the location in MB(2,1) to which new content data was written at block 402. In an embodiment, the first new parity data is transferred during a clock cycle in which subsequent new content data is written to one of the content memory banks in the row to which PB_ROW2 corresponds (i.e., the row of which MB(2,1) is a part).

At block 422, the second new parity data is transferred from the second cache memory to location in the second parity memory bank corresponding to the location to which new content data was written at block 402. In an embodiment, the memory controller device 392 transfers the second new parity data from the Cache_Col1 to location in PB_Col1 corresponding to the location in MB(2,1) to which new content data was written at block 402. In an embodiment, the second new parity data is transferred during a clock cycle in which subsequent new content data is written to one of the content memory banks in the column to which PB_Col1 corresponds (i.e., the column of which MB(2,1) is a part).

At block 424, the third new parity data is transferred from the third cache memory to location in the third parity memory bank corresponding to the location to which new content data was written at block 402. In an embodiment, the memory controller device 392 transfers the second new parity data from the Cache_Crn to location in PB_Crn corresponding to the location in MB(2,1) to which new content data was written at block 402. In an embodiment, the new parity data is transferred during a clock cycle in which subsequent new content data is written to any one of the content memory banks (e.g., a content memory bank in any row and any column).

In an embodiment, blocks 402-408 are performed during a first clock cycle of the write operation. In an embodiment, the first clock cycle of the write operation is an initial clock cycle of the write operation. After blocks 402-408 are performed during the first clock cycle of the write operation, all of the content memory banks and all of the parity memory banks become available to be accessed for other operations, such as another write operation or one or more read operations, during a next clock cycle that immediately follows the first clock cycle of the write operation. Because all of the content memory banks and all of the parity memory banks are available for other operations during the next clock cycle immediately following the first clock cycle, one write operation or up to four simultaneous read operations directed to any of the content memory banks can be performed in the next clock cycle immediately following the first clock cycle of the write operation, in an embodiment. For example, four simultaneous read operations can be performed in the next clock cycle immediately following the first clock cycle even if the four simultaneous read operations are directed to a same content memory bank, in an embodiment. Thus, in an embodiment, the method 400 includes block 426 which comprises performing, during a second cycle that immediately follows the first clock cycle, four simultaneous read operations directed to a particular content memory bank. In an embodiment, the four simultaneous read operations directed to the particular content memory bank are performed by reading, for a first of the read operations, requested content data directly from the particular content memory bank, and reconstructing, for second, third and fourth ones of the read operations, requested content data using content data in corresponding locations in other content memory banks and parity data in corresponding locations in parity memory banks as described above, for example.

As described above, parity memory banks, such as the parity memory bank PB 112 of FIG. 1, or (i) column parity memory banks 308, 320, 322, 344, (ii) row parity memory banks 352, 358, 364, 370, and (iii) corner parity bank 376 in the memory device 300 of FIG. 3, are single port memories, in an embodiment. In another embodiment, the parity memory banks, such as the parity memory bank PB 112 of FIG. 1, or (i) column parity memory banks 308, 320, 322, 344, (ii) row parity memory banks 352, 358, 364, 370, and (iii) corner parity bank 376 in the memory device 300 of FIG. 3, are replaced by two port memories. Such two port parity memory banks allow a read operation to be performed in a parity memory bank concurrently (e.g., in the same clock cycle) with new parity data being written to the parity memory bank. Because a read operation can be performed in a parity memory bank concurrently (e.g., in the same clock cycle) with new parity data being written to the parity memory bank, cache memories for temporarily storing new parity data are not needed, in an embodiment. Rather, new parity data can be written directly to a parity memory bank without blocking a read operation in the same clock cycle in the parity memory bank. Thus, cache memories are omitted in at least some embodiments in which two port parity memory banks are used, and when new parity data to be written to a parity memory bank is generated, the new parity data is written directly the parity memory banks, in at least some such embodiments. For example, referring to FIG. 1, in an embodiment in which the parity memory bank PB 112 is a two port memory, the memory device 100 omits the cache memory 116. When the memory controller device 118 generates new parity data to be written to the PB 112, the memory controller device 118 writes the new parity data directly to the PB 112, in this embodiment. Because a read operation in the PB 112 can be performed concurrently with the new parity data being written to the PB 112, two simultaneous read requests can be serviced in a next clock cycle that immediately follows an initial clock cycle of a write operation even if new parity data that results from the write operation is concurrently being written to the PB 112, in an embodiment. Similarly, referring to FIG. 3, column parity memory banks 308, 320, 322, 344, row parity memory banks 352, 358, 364, 370, and corner parity bank 376 in the memory device 300 are two port memories, and the cache memories 312, 324, 336, 348, 354, 360, 366, 372, 378 are omitted from the memory device 300, in an embodiment.

Figure 5:
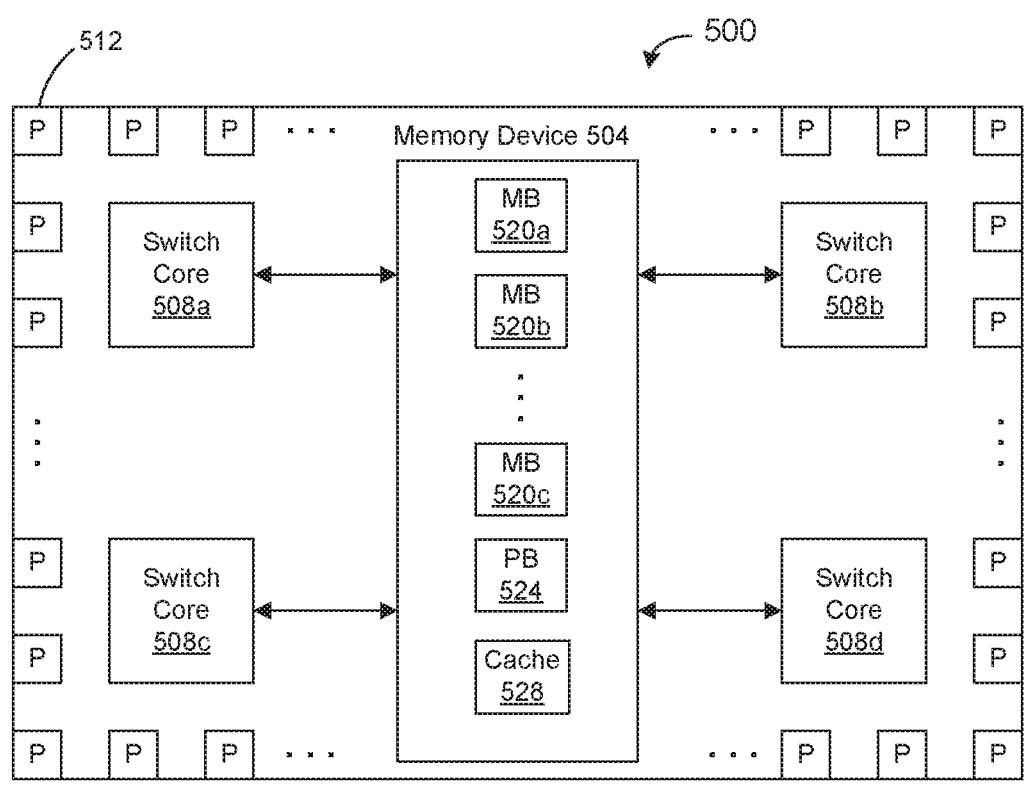
FIG. 5 is a block diagram of an example network device including a shared access memory, according to an embodiment.

FIG. 5 is a block diagram of an example multi-core network device 500, such as a Layer-2 and/or Layer-3 switch, according to an embodiment. The network device 500 includes a memory device 504 coupled to and utilized by multiple packet processing cores 508, also referred to herein as switch cores or switching cores, as will be described in more detail below. The network device 500 also includes a plurality of ports 512, and each port 512 is coupled to a respective communication link associated with one or more communication networks. The packet processing cores 508 are configured to process packets received via the ports 512 and to determine respective ports 512 via which the packets should be subsequently transmitted, in an embodiment.

The packet processing cores 508 utilize one or more control tables, such as a forwarding database table, that are stored in the memory device 504 and are shared by the processing cores 508, in an embodiment. Because the packet processing cores 508 operate in parallel, two or more of the cores 508 may need to perform memory operations on a same portion of the memory device 504 simultaneously, for example to perform simultaneous read operations to obtain forwarding information for packets that come from, or that are destined for, the same address.

The memory device 504 includes a first set of memory banks 520 to store content data, such as one or more control tables, in an embodiment. The memory device 504 also includes a second set of one or more memory banks 524 to store redundancy information associated with content data stored in the first set of memory banks 520. When the memory device 504 simultaneously receives (e.g., during a same clock cycle of the memory device 504) multiple requests to perform memory operations in one of the memory banks 520, the memory device 504 is configured to determine that one or more of the multiple requests is blocked from accessing the one memory bank 520, in an embodiment. In response to determining that one or more of the multiple requests was blocked from accessing the one memory bank 520, the memory device 504 is configured to access redundancy data from the memory bank 524 and to reconstruct data stored in the one memory bank 520 using the redundancy data and without using data stored in the one memory bank 520. One of the requested memory operations is performed using data stored in the one memory bank 520. On the other hand, another one of the requested memory operations is performed without accessing the one memory bank 520 and based on the data reconstructed using the redundancy data from the memory bank 524, in an embodiment.

In the network device 500, each packet processing core 508 generally acts as a client that generates requests to perform memory operations in one or more memory banks 520 of the memory device 504. The term "client," as used herein, refers to a device configured to generate requests to perform memory operations in one or more memory banks of a memory device. In an embodiment in which a packet processing core 508 includes multiple devices (e.g., circuits) each configured to generate requests to perform memory operations in one or more memory banks 520 of the memory device 504, then the packet processing core 508 includes or acts as multiple clients. For example, in an embodiment in which a packet processor includes a pipeline with a plurality of pipeline stages, and multiple pipeline stages are configured to generate requests to perform memory operations in one or more memory banks of a memory device, the packet processor includes or acts as multiple clients. As another example, a single processor or single pipeline stage is configured to generate simultaneously multiple memory access requests, and thus the single processor or single pipeline stage includes or acts as multiple clients.

In an embodiment, the memory device 504 is a solid-state device. For example, the memory device 504 is included on an integrated circuit (IC) or other solid-state device. In an embodiment, the memory device 504 and the packet processing cores 508 are included on a single IC.

In various embodiments, the memory device 504 includes one or more cache memories 528 associated with the parity memory bank 524 to temporarily store parity data before the parity data is transferred to the parity memory bank 524. In various embodiments, the memory device 504 is configured to service, in a first clock cycle of the memory device 504, a write request in a manner that ensures that either a subsequent write request or multiple read requests can be serviced in a next clock cycle that immediately follows the first clock cycle. In an embodiment, the memory device 504 includes the memory device 100 of FIG. 1. In another embodiment, the memory device 504 includes the memory device 300 of FIG. 3.

Although the memory device 504 is discussed above as being included the network device 500, similar memory devices may be utilized in other types of computing systems such as personal computers, servers, mainframes, smart phones, gaming systems, set top boxes, communication equipment, etc. For example, a computing system may include multiple devices (e.g., processors (e.g., central processing units, coprocessors, special-purpose processing units, etc.), circuits, pipeline stages, etc.) that each act as a client with respect to a memory device such as the memory device 504.

Figure 6:
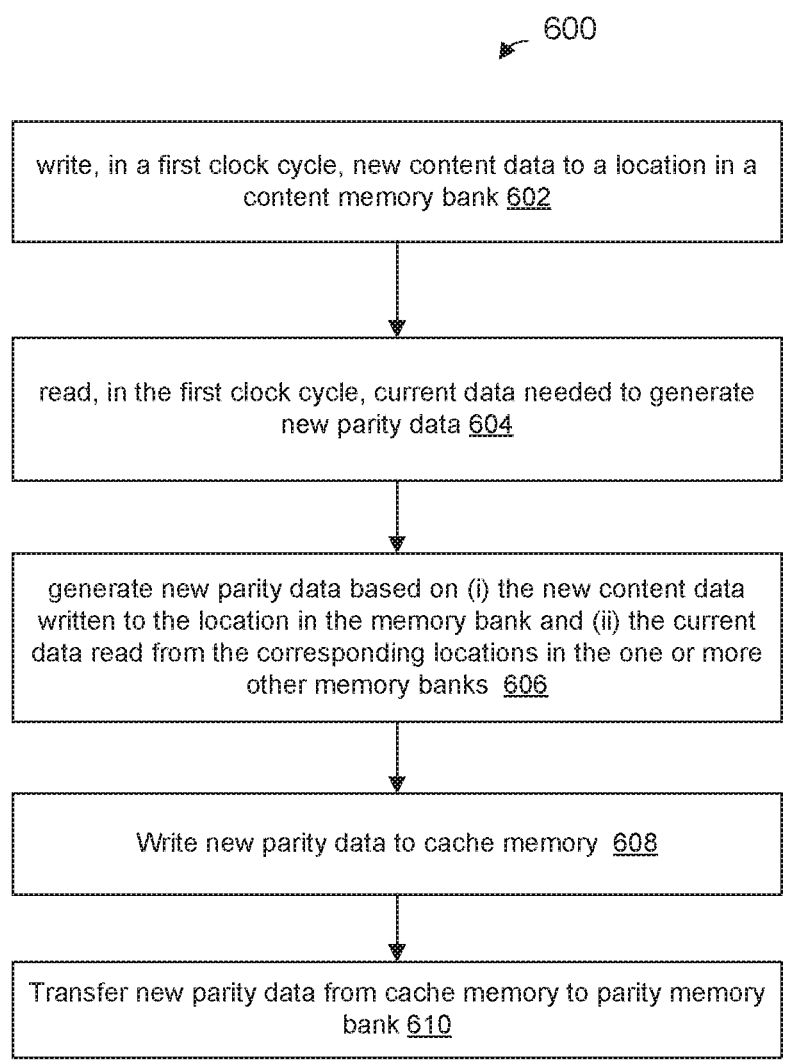
FIG. 6 is a flow diagram of an example method for performing a write operation in a memory device, according to an embodiment.

FIG. 6 is a flow diagram of a method for performing a write operation in a memory device that includes a set of content memory banks and one or more parity memory banks, according to an embodiment. The method 600 is implemented in one of the memory device 100 of FIG. 1, the memory device 300 of FIG. 3, and the memory device 504 of FIG. 5, in various embodiments. In other embodiments, the method 500 is implemented in suitable memory devices different from the memory device 100 of FIG. 1, the memory device 300 of FIG. 3, and the memory device 504 of FIG. 5. Similarly, the memory device 100 of FIG. 1, the memory device 300 of FIG. 3, and the memory device 504 of FIG. 5 implement other suitable methods from performing write operations, in other embodiments.

At block 602, in a first clock cycle of the write operation, new content data is written to a location in a first memory bank of a set of memory banks included in the memory device.

At block 604, also in the first clock cycle of the write operation, current data needed to generate new parity data is read from corresponding locations in one or more other content memory banks among the set of content memory banks and/or the one or more parity memory banks. For example, in an embodiment in which the memory device includes a set of content memory banks and a parity memory bank that corresponds to the set of content memory banks, such as the memory device 100 of FIG. 1, in an embodiment, current data is read from each of the content memory banks besides the first content memory bank to which new content data is written at block 602. As another example, in an embodiment in which the memory device includes a two dimensional array of content memory banks and parity memory banks, such as the memory device 300 of FIG. 3, current data is read from (i) each of the other content memory banks in a row of content memory banks of which the first content memory bank is a part and (ii) each of the other content memory banks in a column of content memory banks of which the first content memory bank is a part, and (iii) each of row parity banks besides the row parity bank corresponding to the row of which the first memory bank is a part. Alternatively, in another embodiment in which the memory device includes a two dimensional array of content memory banks and parity memory banks, such as the memory device 300 of FIG. 3, current data is read from (i) each of the other content memory banks in a row of content memory banks of which the first content memory bank is a part and (ii) each of the other content memory banks in a column of content memory banks of which the first content memory bank is a part, and (iii) each of column parity banks besides the column parity bank corresponding to the column of which the first memory bank is a part.

At block 606, new parity data is generated. In an embodiment, the new parity is generated based at least on the new content data written to the first memory bank at block 602 and the current data read at block 604. The new parity data is generated to replace the current parity data in one or more locations the parity memory banks corresponding to the location in the first content memory bank to which the new content data is written at block 602, in an embodiment. For example, in an embodiment in which the memory device includes a set of memory banks and a parity memory bank that corresponds to the set of content memory banks, such as the memory device 100 of FIG. 1, new parity data is generated to replace current parity data in a location in the parity memory bank corresponding to the location in the first content memory bank to which the new content data is written at block 602. As another example, in an embodiment in which the memory device includes a two dimensional array of content memory banks and parity memory banks, such as the memory device 300 of FIG. 3, first new parity data is generated to replace current parity data in a corresponding location in a row parity memory bank corresponding to the row of which the first content memory bank is a part, second new parity data is generated to replace current parity data in corresponding location in a column parity memory bank corresponding to a column of which the first content memory bank is a part, and third new parity data is generated to replace current parity data in a corresponding location in the corner parity memory bank. In any event, because the current data needed to generate the new parity data is read from the memory banks at block 604 in the first clock cycle in which the new content data is written to the first content memory bank at block 602, all of the content memory banks and the one or more other content memory banks will be available for performing other operations, such as another write operation or one or more simultaneous read operations, in a next clock cycle that immediately follows the first clock cycle, in an embodiment.

At block 608, the new parity data generated at block 606 is written to a cache memory. For example, in an embodiment in which the memory device that includes a set of memory banks and a parity memory bank that corresponds to the set of content memory banks, such as the memory device 100 of FIG. 1, block 608 includes writing the new parity data to a cache memory corresponding to the parity memory bank. As another example, in an embodiment in which the memory device includes a two dimensional array of content memory banks and parity memory banks, such as the memory device 300 of FIG. 3, writing the new parity data to the cache memory includes writing the first new parity data to a cache memory corresponding to the first row memory bank, writing the second new parity data to the first column memory bank, and writing the third new parity data to the corner memory bank.

At block 610, the new parity data is transferred from the cache memory to the corresponding parity memory banks. For example, in an embodiment in which the memory device that includes a set of memory banks and a parity memory bank that corresponds to the set of content memory banks, such as the memory device 100 of FIG. 1, block 608 includes transferring the new parity data from the cache memory a location in the parity memory bank corresponding to the location the location in the first content memory bank to which the new content data is written at block 602. As another example, in an embodiment in which the memory device includes a two dimensional array of content memory banks and parity memory banks, such as the memory device 300 of FIG. 3, first new parity data is transferred from the first cache memory to the a location in the row parity bank corresponding to the location in the first content memory bank to which the new content data is written at block 602, second new parity data is transferred from the second cache memory to a location in the column memory bank corresponding to the location in the first content memory bank to which the new content data is written at block 602, and the third new parity data is transferred from the third cache memory to a location in the corner memory bank corresponding to the location in the first content memory bank to which the new content data is written at block 602. In an embodiment, the new parity data is transferred from the cache memory to the corresponding parity memory bank in a subsequent clock cycle during which subsequent new data is being written to a content memory bank among the set of content memory banks on behalf of a subsequent write operation. Temporarily storing the new parity bank in the cache memory, and transferring the new parity data from the cache memory to the parity memory bank in a subsequent clock cycle during a subsequent write operation, ensures that the parity memory banks are available to be accessed on behalf of other operations after the first clock cycle of the write operation, in an embodiment.

The various blocks, operations, and techniques described above may be implemented in hardware. When implemented in hardware, the hardware may comprise one or more of i) discrete components, ii) one or more integrated circuits, iii) one or more application-specific integrated circuits (ASICs), one or more programmable logic devices (PLDs), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A memory for use in a network device, comprising:
   a set of content memory banks configured to store content data associated with processing network packets, the set of content memory banks including an array of content memory banks arranged in rows of content memory banks and columns of content memory banks;

a set of parity memory banks, corresponding with the set of content memory banks, configured to store parity data, the set of parity memory banks including (i) respective row parity memory banks corresponding with respective rows of content memory banks, (ii) respective column parity memory banks corresponding with respective columns of content memory banks, and (iii) a corner parity memory bank;

a cache memory corresponding to the set of parity memory banks; and a memory controller device configured to
service a particular write request, received from a particular client device, to write new content data to a location in a particular content memory bank among the set of content memory banks, the particular content memory bank being part of (a) a particular row of content memory banks among the set of content memory banks, the particular row corresponding with a particular row parity memory bank among the respective row parity memory banks and (b) a particular column of content memory banks among the set of content memory banks, the particular column corresponding with a particular column parity memory bank among the respective column parity memory banks, wherein servicing the particular write request includes using a first clock cycle of servicing the particular write request to both (i) write the new content data to the location in the particular content memory bank and (ii) read data for updating parity data based on the new content data written to the particular memory bank, wherein the data for updating the parity data includes (a) current content data from corresponding locations in a subset of other content memory banks in the particular row and the particular column, the subset of other content memory banks excluding the particular content memory bank, and (b) one of (i) current row parity data from corresponding locations in a subset of the respective row parity memory banks, the subset of the respective row parity memory banks excluding the particular row parity memory bank, or (ii) current column parity data from corresponding locations in a subset of the respective column parity memory banks, the subset of the respective column parity banks excluding the particular column parity memory bank, generate new parity data, the memory controller device being configured to
generate new row parity data and new column parity data based on (i) the new content data written to the location in the particular content memory bank and (ii) the current content data read from the corresponding locations in the subset of other content memory banks, and generate new corner parity data based on one of (i) the new row parity data and the current row parity data read from the subset of the respective row parity memory banks, or (ii) the new column parity data and the current column parity data read from the subset of the respective column parity memory banks, write the new parity data to the cache memory instead of writing the new parity data directly to parity memory banks to ensure that up to a maximum supported number of concurrent read requests received from multiple client devices can be serviced in a next clock cycle that immediately follows the first clock cycle of servicing the particular write request received from the particular client device, and in one or more second clock cycles subsequent to the first clock cycle, transfer the new parity data from the cache memory to the set of parity memory banks, including (i) transferring the new row parity data to the particular row parity memory bank, (ii) transferring the new column parity data to the particular column parity memory bank, and (iii) transferring the new corner parity data to the corner parity memory bank.

2. The memory of claim 1, wherein the memory controller device is further configured to, in the next clock cycle that immediately follows the first clock cycle, service multiple simultaneous read requests to read content data from the set of content memory banks, wherein the memory controller device is configured to
service one read request of the multiple read requests by reading content data directly from a content memory bank among the set of content memory banks, and service another one of the multiple read requests by reconstructing content data in the content memory bank based on (i) corresponding content data in one or more other content memory banks among the set of content memory banks and (ii) corresponding parity data in one of (a) the cache memory and (b) the set of parity memory banks.

3. The memory of claim 2, wherein
the multiple read requests include a first read request to read first content data from a first location in a first content memory bank among the set of content memory banks and a second read request to read second content data from a second location in the first content memory bank, and the memory controller device is configured to, in the next clock cycle that immediately follows the first clock cycle,
service the first read request by reading the first content data from the first location in the first content memory bank, and service the second read request by reconstructing the second content data at the second location in the first content memory bank based on parity data corresponding to the second location in the first content memory bank.

4. The memory of claim 3, wherein the memory controller is configured to reconstruct the second content data at the second location in the first content memory bank by
reading content data from locations in one or more second content memory banks, among the set of content memory banks, corresponding to the second location in the first content memory bank;

reading the parity data corresponding to the second location in the first content memory bank, including selectively reading the parity data from one of (i) locations in one or more parity memory banks, among the set of content memory banks, corresponding to the second location in the first content memory bank and (ii) the cache memory, and reconstructing the second content data at the second location in the first content memory bank based on the content data read from the one or more second content memory banks and the parity data read from one of (i) the one or more parity memory banks and (ii) the cache memory.

5. The memory of claim 1, wherein
the memory controller is configured to generate (i) the new row parity data to replace corresponding current parity data in the particular row parity memory bank, (ii) the new column parity data to replace corresponding current parity data in the particular column parity memory bank, and (iii) the new corner parity data to replace corresponding current parity data in the corner parity memory bank.

6. The memory of claim 1, wherein
the cache memory includes a first cache memory corresponding to the particular row parity memory bank, a second cache memory corresponding to the particular column parity memory bank, and a third cache memory corresponding to the corner parity memory bank, and
the memory controller device is configured to
write (i) the new row parity data to the first cache memory, (ii) the new column parity data to the second cache memory and (iii) the new corner parity data to the third cache memory, and
in the one or more second clock cycles subsequent to the first clock cycle, (i) transfer the new row parity data from the first cache memory to the particular row parity memory bank, (ii) transfer the new column parity data from the second cache memory to the particular column parity memory bank, and (iii) transfer the new corner parity data from the third cache memory to the corner parity memory bank.

7. The memory of claim 1, wherein the memory controller is configured to transfer the new parity data from the cache memory to the set of parity memory banks concurrently with servicing one or more subsequent write requests to write subsequent new content data to the set of content memory banks.

8. The memory of claim 1, wherein the memory controller device is further configured to, in the next clock cycle that immediately follows the first clock cycle, service a subsequent write request to write subsequent new content data to the set of content memory banks.

9. The memory of claim 1, wherein set of content memory banks comprises single port memories.

10. The memory of claim 1, wherein the set of parity memory banks comprises single port memories.

11. A method of writing new data to a memory device, the method comprising:
writing, using a memory controller device in a first clock cycle of servicing a particular write request received from a particular client device, new content data to a location in a particular content memory bank among a set of content memory banks, the set of content memory banks including an array of content memory banks arranged in rows of content memory banks and columns of content memory banks, the particular content memory bank being part of (a) a particular row of content memory banks among the set of content memory banks, the particular row corresponding with a particular row parity memory bank among a set parity memory banks, respective row parity memory banks in the set of parity memory banks corresponding with respective rows of content memory banks and (b) a particular column of content memory banks among the set of content memory banks, the particular column corresponding with a particular column parity memory bank among the set parity memory banks, respective column parity memory banks in the set of parity memory banks corresponding with respective columns of content memory banks;
reading, using the memory controller device in the first clock cycle of servicing the particular write request received from the particular client device, data for updating parity data based on the new content data written to the particular memory bank, including reading (i) current content data from corresponding locations in a subset of other content memory banks in the particular row and the particular column, the subset of other content memory banks excluding the particular content memory bank and (ii) one of (a) current row parity data from corresponding memory locations in a subset of the respective row parity memory banks, the subset of the respective row parity memory banks excluding the particular row parity memory bank and (b) current column parity data from corresponding locations in a subset of the respective column parity memory banks, the subset of the respective column parity banks excluding the particular column parity memory bank;
generating, using the memory controller device, new parity data, including
generating new row parity data and new column parity data based on (i) the new content data written to the location in the particular content memory bank and (ii) the current content data read from the corresponding locations in the subset of other content memory banks, and
generating new corner parity data based on one of (i) the new row parity data and the current row parity data read from the subset of the respective row parity memory banks or (ii) the new column parity data and the current column parity data read from the subset of the respective column parity memory banks;
writing, using the memory controller device, the new parity data to a cache memory instead of writing the new parity data directly to parity memory banks to ensure that up to a maximum supported number of concurrent read requests received from multiple client devices can be serviced in a next clock cycle that immediately follows the first clock cycle of servicing the particular write request received from the particular client device; and
transferring, using the memory controller device in one or more second clock cycles subsequent to the first clock cycle, the new parity data from the cache memory to the set of parity memory banks, including (i) transferring the new row parity data to the particular row parity memory bank, (ii) transferring the new column parity data to the particular column parity memory bank, and (iii) transferring the new corner parity data to the corner parity memory bank.

12. The method of claim 11, further comprising servicing, in the next clock cycle that immediately follows the first clock cycle, multiple simultaneous read requests to read content data from the set of content memory banks, including
servicing one read request of the multiple read requests by reading content data directly from a content memory bank among the set of content memory banks, and
servicing another one of the multiple read requests by reconstructing content data in the content memory bank based on (i) corresponding content data in one or more other content memory banks among the set of content memory banks and (ii) corresponding parity data in one of (a) the cache memory and (b) the set of parity memory banks.

13. The method of claim 12, wherein
the multiple read requests include a first read request to read first content data from a first location in a first content memory bank among the set of content memory banks and a second read request to read second content data from a second location in the first content memory bank, and the method further comprises, in the next clock cycle that immediately follows the first clock cycle,
servicing the first read request by reading the first content data from the first location in the first content memory bank, and
servicing the second read request by reconstructing the second content data at the second location in the first content memory bank based on parity data corresponding to the second location in the first content memory bank.

14. The method of claim 13, wherein reconstructing the second content data at the second location in the first memory bank comprises
reading content data from locations in one or more second content memory banks, among the set of content memory banks, corresponding to the second location in the first content memory bank;
reading the parity data corresponding to the second location in the first parity memory bank, including selectively reading the parity data from one of (i) locations in one or more parity memory bank, among the set of parity memory banks, corresponding to the second location in the first content memory bank and (ii) the cache memory, and
reconstructing the second content data at the second location in the first content memory bank based on the content data read from the one or more second content memory banks and the parity data read from one of (i) the one or more parity memory banks and (ii) the cache memory.

15. The method of claim 11, wherein
generating the new parity data comprises generating (i) the new row parity data to replace corresponding current parity data in the particular row parity memory bank, (ii) the new column parity data to replace corresponding current parity data in the particular column parity memory bank, and (iii) the new corner parity data to replace corresponding current parity data in the corner parity memory bank.

16. The method of claim 11, wherein
the cache memory includes a first cache memory corresponding to the particular row parity memory bank, a second cache memory corresponding to the particular column parity memory bank, and a third cache memory corresponding to the corner parity memory bank, writing the new parity data to the one or more parity memory banks comprises writing (i) the new row parity data to the first cache memory, (ii) the new column parity data to the second cache memory and (iii) the new corner parity data to the third cache memory, and transferring, in the one or more second clock cycles subsequent to the first clock cycle, the new parity data from the cache memory to the set of parity memory banks comprises (i) transferring the new row parity data from the first cache memory to the particular row parity memory bank, (ii) transferring the new column parity data from the second cache memory to the particular column parity memory bank, and (iii) transferring the new corner parity data from the third cache memory to the corner parity memory bank.

17. The method of claim 11, wherein transferring the new parity data from the cache memory to the set of parity memory banks is performed concurrently with servicing one or more subsequent write requests to write subsequent new content data to the set of content memory banks.

18. The method of claim 11, further comprising, servicing, with the memory controller device in the next clock cycle that immediately follows the first clock cycle, a subsequent write request to write subsequent new content data to the set of content memory banks.

19. The method claim 11, wherein the set of content memory banks comprises single port memories.

20. The method of claim 11, wherein the set of parity memory banks comprises single port memories.

21. The memory of claim 1, wherein the memory controller is configured to transfer new parity data to a particular parity memory bank concurrently with servicing at least one other request for performing a memory operation in at least one of the content memory banks when servicing the at least one other request does not require access to the particular parity memory bank.

22. The method of claim 11, wherein transferring the new parity data from the cache memory to the set of parity memory banks includes transferring new parity data to a particular parity memory bank concurrently with servicing at least one other request for performing a memory operation in at least one of the content memory banks when servicing the at least one other request does not require access to the particular parity memory bank.

* * * * *